Patented Sept. 14, 1926.

1,600,113

UNITED STATES PATENT OFFICE.

WILLY O. HERRMANN AND HANS DEUTSCH, OF MUNICH, GERMANY, ASSIGNORS TO CONSORTIUM FÜR ELEKTROCHEMISCHE INDUSTRIE G. M. B. H., OF MUNICH, GERMANY.

PROCESS OF RESINIFYING ALIPHATIC ALDEHYDES.

No Drawing. Application filed October 16, 1922, Serial No. 594,973, and in Germany October 20, 1921.

When causing inorganic acids to react upon aliphatic aldehydes, products of polymerization and condensation of the aldehydes are obtained e. g. from acetaldehyde, paraldehyde, metaldehyde and crotonaldehyde. As by-products of such reactions between aliphatic aldehydes and acids viscous resin-like masses sometimes are formed. As they have no technical valuable qualities and as they are formed only in a small output they have found no technical interest.

We have found that it is possible to produce such resins in a good output and to improve their qualities by continuing the reaction of inorganic acids upon aldehydes with more than one carbon atom for a longer time and with application of heat. Instead of inorganic acids other substances which gave H-ions in aqueous solutions may also be employed e. g. acid salts or mixtures of acids and acid salts. The reaction is preferably supported by a fine distribution of the reacting components e. g. by stirring and may also be executed in the presence of an organic solvent.

The resins produced according to the present invention may be employed like natural resins. They are soluble in the ordinary solvents and are suitable for the manufacture of varnishes, of impregnating and polishing solutions, of dressings, and the like.

The aldehyde-resins thus obtained may be subjected to a cleaning process e. g. to a wet-milling-process.

The aldehyde-resins thus obtained may also be hardened like natural resins e. g. by melting with oxides of metals or by any other known hardening process.

They may also be subjected to an oxidizing treatment with oxygen, ozone or other oxidizing means in order to bleach the resins and to make them soluble in alkaline acting agents.

Example 1.

Add 800 parts of acetaldehyde to 400 parts of a 25 per cent sulphuric acid in a stirring vessel provided with a cooling jacket. The temperature is at first kept at above 40 centigrade degrees for several hours and then raised to 100 centigrade degrees. The reaction is stopped when a sample of the reacting mass gives a resinous product tough at ordinary temperature. This tough mass is washed and heated for a longer time at a temperature above 150 centigrade degrees. After cooling the product obtained is a hard resin. It may be cleaned by a washing process e. g. in a ball mill with water and after filtering off, remelted. By means of a rolling apparatus the molten resin can be brought into the form of shellac like sheets.

Example 2.

Add 1000 parts of crotonic aldehyde to 200 parts of a 10 per cent hydrochloric acid while well agitating. The reacting mass is then heated until it is transformed into a dark coloured tough product, which is treated as shown in Example 1 and a hard resin is finally produced.

Example 3.

800 parts of acetaldehyde are introduced into 600 parts of a 25 per cent solution of sodium bisulphate. The reaction is led as in Example 1.

Example 4.

1000 parts of butyric aldehyde are introduced, while stirring and cooling, into a mixture of 100 parts sixty per cent sulphuric acid and 1000 parts of ethyl alcohol. The reacting mass is heated until a sample after having been diluted with water gives a tough resinous product. This resinous product is then treated according to Example 1 and finally a hard resin is obtained as shown in Example 1.

Example 5.

Add 1000 parts of crotonic aldehyde to a mixture of 100 parts of a 20 per cent sulphuric acid and 400 parts of acetic acid. The reacting mass is heated for several hours and then diluted with water. Thus a dark coloured resinous product is obtained which may be transformed into a hard resin according to Example 1.

Example 6.

60 parts of a resin obtained according to Example 1 are dissolved in 300 parts of acetic acid and gradually peroxide of hydrogen is added. The solution, dark coloured at first, is getting light. The addition of the peroxide may be stopped as soon as the solution is bleached as desired. But the addition of peroxide may be continued and a resin soluble in an aqueous solution of borax is obtained by adding water to the solution and filtering off.

The same products are gotten if the oxidizing treatment of the aldehyde resins is carried out with other oxidizing means e. g. with oxygen, especially in the presence of catalyzers, or with ozone or gases containing ozone.

*Example 7.*

100 parts of a resin obtained according to Example 1 are molten and 2 parts of aluminium hydroxide are added. After a heating at above 150 centigrade degrees for several hours a product is formed, that shows a greater hardness than the original resin.

*Example 8.*

100 parts of a resin obtained according to Example 1 are boiled with 500 parts of ethyl alcohol for several hours on the reflux condenser. By addition of water a resin is precipitated that after being molten is lighter and more elastic than the original product.

A similar hardening is produced by heating a resin obtained according to Example 1 with 4 per cent of glycerine.

What we claim is:

1. A process of producing artificial resins which consists in subjecting aliphatic aldehydes of the type, wherein that carbon-atom, which is adjacent to the carbonyl-group, still carries at least one hydrogen atom, to a long continued action of inorganic substances which give H-ions in aqueous solutions, until at least the bulk of aldehyde has been converted into resinous products.

2. A process of producing artificial resins which consists in subjecting aliphatic aldehydes of the type, wherein that carbon-atom, which is adjacent to the carbonyl-group, still carries at least one hydrogen atom, to a long continued action of inorganic substances which give H-ions in aqueous solutions, until at least the bulk of aldehyde has been converted into resinous products and promoting the formation of the resin by heating.

3. A process of producing artificial resins which consists in subjecting aliphatic aldehydes of the type, wherein that carbon-atom, which is adjacent to the carbonyl-group, still carries at least one hydrogen atom, to a long continued action of inorganic substances which give H-ions in aqueous solutions, until at least the bulk of aldehyde has been converted into resinous products and carrying out the formation of the resin in the presence of an organic solvent.

4. A process of producing artificial resins which consists in subjecting aliphatic aldehydes of the type, wherein that carbon-atom, which is adjacent to the carbonyl-group, still carries at least one hydrogen atom, to a long continued action of inorganic substances which give H-ions in aqueous solutions, until at least the bulk of aldehyde has been converted into resinous products and carrying out the formation of the resin in the presence of an organic solvent with heating.

5. A process of producing artificial resins which consists in subjecting aliphatic aldehydes of the type, wherein that carbon-atom, which is adjacent to the carbonyl-group, still carries at least one hydrogen atom, to a long continued action of inorganic substances which give H-ions in aqueous solutions, until at least the bulk of aldehyde has been converted into resinous products and heating the resinous products.

6. A process of producing artificial resins which consists in subjecting aliphatic aldehydes of the type, wherein that carbon-atom, which is adjacent to the carbonyl-group, still carries at least one hydrogen atom, to a long continued action of inorganic substances which give H-ions in aqueous solutions, until at least the bulk of aldehyde has been converted into resinous products, promoting the formation of the resin by heating and subjecting the resinous products obtained to an oxidizing treatment.

7. A process of producing artificial resins which consists in subjecting aliphatic aldehydes of the type, wherein that carbon-atom, which is adjacent to the carbonyl-group, still carries at least one hydrogen atom, to a long continued action of inorganic substances which give H-ions in aqueous solutions, until at least the bulk of aldehyde has been converted into resinous products, promoting the formation of the resin by heating and hardening the resinous products obtained.

8. A process of producing artificial resins which consists in subjecting aliphatic aldehydes of the type, wherein that carbon-atom, which is adjacent to the carbonyl-group, still carries at least one hydrogen atom, to a long continued action of inorganic substances which give H-ions in aqueous solutions, until at least the bulk of aldehyde has been converted into resinous products, carrying out the formation of the resin with heating in the presence of an organic solvent and subjecting the resinous products obtained to an oxidizing treatment.

9. A process of producing artificial resins which consists in subjecting aliphatic aldehydes of the type, wherein that carbon-atom, which is adjacent to the carbonyl-group, still carries at least one hydrogen atom, to a long continued action of inorganic substances which give H-ions in aqueous solutions, until at least the bulk of aldehyde has been converted into resinous products, carrying out the formation of the resin with heating in the presence of an organic solvent and hardening the resinous products obtained.

10. A process of producing artificial resins which consists in subjecting aliphatic aldehydes of the type, wherein that carbon-atom, which is adjacent to the carbonyl-group, still carries at least one hydrogen atom, to a long continued action of inorganic substances which give H-ions in aqueous solutions, until at least the bulk of aldehyde has been converted into resinous products, heating the resinous products obtained and subjecting them to an oxidizing treatment.

11. A process of producing artificial resins which consists in subjecting aliphatic aldehydes of the type, wherein that carbon-atom, which is adjacent to the carbonyl-group, still carries at least one hydrogen atom, to a long continued action of inorganic substances which give H-ions in aqueous solutions, until at least the bulk of aldehyde has been converted into resinous products, heating the resinous products obtained and hardening them.

12. A process of producing artificial resins which consists in subjecting aliphatic aldehydes of the type, wherein that carbon-atom, which is adjacent to the carbonyl-group, still carries at least one hydrogen atom, to a long continued action of inorganic substances which give H-ions in aqueous solutions, until at least the bulk of aldehyde has been converted into resinous products, heating the resinous products obtained and treating them by a washing process.

In witness whereof we have hereunto set our hands.

DR. WILLY O. HERRMANN.
DR. HANS DEUTSCH.